(12) United States Patent
Novo et al.

(10) Patent No.: US 8,176,409 B2
(45) Date of Patent: May 8, 2012

(54) SYSTEM AND METHOD FOR ELECTRONIC PUBLICATION OF SCIENTIFIC DATA AND ANALYSIS

(75) Inventors: David Novo, Los Angeles, CA (US); Juan Luis Almara, Parana Entre Rios (AR); Allen Michael Dixon, Pasadena, CA (US); Daniel Zimmerman, Los Angeles, CA (US); Vladyslav Kryvokobylsky, Studio City, CA (US)

(73) Assignee: De Novo Software, Los Angeles, CA (US)

( * ) Notice: Subject to any disclaimer, the term of this patent is extended or adjusted under 35 U.S.C. 154(b) by 1007 days.

(21) Appl. No.: 11/881,004

(22) Filed: Jul. 24, 2007

(65) Prior Publication Data

US 2009/0030620 A1    Jan. 29, 2009

(51) Int. Cl.
    *G06F 17/21*  (2006.01)
    *G06F 17/22*  (2006.01)
(52) U.S. Cl. ......................... 715/200; 715/248
(58) Field of Classification Search ............ 715/200
    See application file for complete search history.

(56) References Cited

U.S. PATENT DOCUMENTS

| | | | |
|---|---|---|---|
| 5,802,518 A * | 9/1998 | Karaev et al. ................ 1/1 |
| 7,324,648 B1 * | 1/2008 | Deaver et al. ............. 380/278 |
| 2002/0034285 A1 * | 3/2002 | Jarvi et al. ............ 379/114.01 |
| 2009/0307248 A1 * | 12/2009 | Moser et al. ............... 707/101 |
| 2010/0023582 A1 * | 1/2010 | Pedersen et al. ........... 709/203 |
| 2010/0055678 A1 * | 3/2010 | Jaatinen et al. ................ 435/6 |
| 2011/0029535 A1 * | 2/2011 | Cole ........................... 707/740 |

OTHER PUBLICATIONS

Tang et al.,"Development of Two-Stage SVM-RFE Gene Selection Strategy for Microarray Expression data Analysis", 2007, IEEE, pp. 365-381.*

Microsoft, "Microsoft Office Excel, Overview of Sharing and Collaborating on Excel Data", printed Nov. 27, 2007 from http://office.microsoft.com/en-us/excel/HA100898961033.aspx?mode=print, pp. 1-10.

Windmill Software Ltd., "Route Data from Instruments and Transducers Into Excel: Free Serial Communication Soft . . . ", Printed Jul. 20, 2007 from http://www.windmill.co.uk/excel.html, pp. 1-4.

\* cited by examiner

*Primary Examiner* — Doug Hutton, Jr.
*Assistant Examiner* — James Debrow
(74) *Attorney, Agent, or Firm* — Kauth, Pomeroy, Peck & Bailey LLP

(57) ABSTRACT

Electronic publication systems are disclosed that enable the analysis and publication of layout files, which contain an analysis strategy and embedded raw data. The published layout files can be accessed by reader applications that are able to read the layout files and modify the analysis strategy within the layout file using the embedded raw data. In many embodiments, the reader applications are unable to access the embedded raw data. In several embodiments, the reader applications prevent the saving or printing of layout files.

31 Claims, 13 Drawing Sheets

SYSTEM AND METHOD FOR ELECTRONIC PUBLICATION OF SCIENTIFIC DATA AND ANALYSIS

BACKGROUND

The present invention relates generally to the field of electronic publication and more specifically to the electronic publication of data and analysis procedures by which to analyze the data.

Scientific research often involves performing experiments, collecting data and analyzing the data. Simply studying the analysis often enables the formation of conclusions based upon the scientific research. However, further analysis using a slightly modified analysis methodology can often yield additional useful information.

Many vendors offer software applications that enable analysis to be performed upon data sets. Provided the data set is retained, a modified analysis can be performed to address any deficiencies in the initial analysis. When a software application is used to perform data analysis, modifying the analysis requires the data, the analysis, the software application that generated the analysis and a significant amount of processing power. This difficultly is particularly apparent when the analysis is performed in a first location and a person desiring to review and modify the analysis is located in a remote location. The large size of the data sets also presents a barrier to easily transmitting them using conventional methods, i.e., email.

Flow cytometry is the science of measuring properties of live cells as the cells pass in a single file stream through a measuring apparatus. The data generated by flow cytometry is typically formatted in accordance with the Flow Cytometry Standard (FCS), which enables analysis of the data using software applications such as FCS Express provided by De Novo Software LLC of Los Angeles, Calif. Analysis that can be performed using such software involves the generation of one dimensional and two dimensional plots. In addition to plots, the software enables the generation of plot overlays and gates, which are used to generate statistics. The analysis strategy and results derived from it are stored in an electronic document referred to as a layout file. Layout files can also optionally contain the raw data used to generate the results.

A person wishing to manipulate analysis contained within a layout file typically requires a copy of the software application that generated the layout file. Analysis software applications such as FCS Express provide the ability to generate reports that are readable using commonly available software applications to enable the distribution of analysis to people that do not possess the software required to review a layout file. The reports are typically in a file format that enables the representation of graphical information. Examples of such file formats include PowerPoint files readable using Microsoft Office Powerpoint distributed by Microsoft Corporation of Redmond, Wash. and/or PDF files readable using Adobe Reader distributed by Adobe Systems Incorporated of San Jose, Calif. A disadvantage of such reports is that the reports do not enable modification of the analysis, because they do not contain the data underlying the analysis.

The adoption of flow cytometry in medical applications has prompted the development of large flow cytometry laboratories which perform analysis on hundreds of samples a day. A doctor receiving an analysis report from such a laboratory must contact the laboratory directly to request any modifications to the analysis. The communication is often conducted via telephone and/or handwritten comments on a print out of an analysis report. Upon receipt of the physician's instructions, the laboratory must then locate the layout file corresponding to the original report and generate another report. If the laboratory has not retained the layout file, then the original sample must be located and the analysis recreated from the raw data. In many instances, the laboratory's interpretation of the physician's telephone or facsimile instructions is incorrect and the analysis must be repeated again.

SUMMARY OF THE INVENTION

Systems and method for electronically publishing layout files are disclosed. In many embodiments of the invention, a publisher application is used to upload a layout file to a database that is accessible via the internet. Users with reader applications are then able to access the layout files. In one aspect of the invention, users can also use the reader applications to modify the analysis strategy contained within layout files. In another aspect of the invention, layout files can be transferred across networks in ways that enable users to review and modify the layout files using widely available reader applications.

One embodiment of the invention, a publication computer connected to a network, a user computer connected to the network and the publication computer is configured to generate a file including an analysis strategy based on the raw data and in which the raw data is embedded. In addition, the publication computer is configured to transfer the file to the user computer, the user computer is configured to receive the file, the user computer is configured to perform modifications of the analysis strategy using the embedded raw data and the user computer is configured to prevent access to the embedded raw data within the file.

In a further embodiment, the raw data comprises at least one data set of instrument measurements expressed as numerical values.

In another embodiment, the raw data comprises at least one image.

In a yet further embodiment, the raw data comprises categorical values.

In yet another embodiment, the analysis strategy includes text information.

In a still further embodiment, the analysis strategy includes graphical objects.

In still another embodiment, the graphical objects include plots.

In a further embodiment again, the graphical objects include plot overlays.

In another embodiment again, the analysis strategy includes gates.

In a further additional embodiment, the analysis includes statistics.

Another additional embodiment, a server connected to a network and a database connected to the server. In addition, the publication computer is configured to transfer the file to the user computer by transmitting the file to the server, the server is configured to store files received from publication computers in a database, the user computer is configured to receive the file by requesting the file from the server, and the server is configured to respond to the file request from the user computer by retrieving the requested file from the database and transmitting the file to the user computer.

In a still yet further embodiment, the server is configured to transmit files the file to the user computer by streaming an encrypted copy of the file to the user computer and the user computer is configured to decrypt the encrypted file.

In still yet another embodiment, the user computer is configured to receive a URL and the user computer is configured to request the file from the server using the URL.

In a yet further embodiment again, the server is configured to respond to the receipt of a file request containing a URL from a user computer by generating a launch file and transmitting the launch file to the user computer and the user computer is configured to use the launch file to initiate the transmission of the file by the server using the launch file.

In yet another embodiment again the launch file is encrypted and includes a second URL identifying the location of the requested file.

In a yet further additional embodiment, the publication computer is configured using a software application that configures the publication computer to read the raw data, generate the file and transmit the file to the server.

In yet another additional embodiment, the user computer is configured using a software application that configures the user computer to read the file and to perform modifications to the analysis strategy contained within the file using the embedded raw data.

In a still further embodiment again, the software application configures the user computer to save modifications to the file.

In still another embodiment again, the software application configures the user computer to print the file.

In a still further additional embodiment, the software application prevents the user computer from reading files unless they are received from the server.

In still another additional embodiment, the user computer is configured to send a search request to the server and the server is configured to provide a list of files stored on the database that satisfy the search request.

In a further additional embodiment again, the instrument is a scientific instrument that generates a raw data set containing numerical values.

In another additional embodiment again, the instrument is a flow cytometer.

In a still yet further embodiment again, the instrument captures images and the raw data includes at least one image file.

In still yet another embodiment again, the publication computer is configured to transfer of the file to the user computer by providing the file to a server and providing the user computer with a unique identifier.

A still yet further additional embodiment also includes an FTP server connected to a network. In addition, the publication computer is configured to provide the file to the FTP server, the FTP server is configured to store the file, the user computer is configured to receive the file by requesting the file from the FTP server using the unique identifier, the FTP server is configured to respond to the file request from the user computer by transmitting a file identified by the unique identifier to the user computer.

In still yet another additional embodiment, the user computer is uniquely identifiable, and access to the file is restricted to the uniquely identifiable user computer.

In another further embodiment, the file transfer is via electronic mail.

In still another further embodiment, a publication computer connected to a network and a user computer connected to the network. In addition, the publication computer is configured using a software application that configures the publication computer generate a file including an analysis strategy based on the raw data and in which the raw data is embedded, and upload the file to a server, the server is configured to provide the publication computer with a unique identifier enabling access to the file, the user computer is configured by a web browsing application to use the unique identifier to request the file from the server, the server is configured to stream an encrypted version of the file to the user computer and the user computer is configured using an analysis application to receive the encrypted file from the server, decrypt at least portions of the file and perform modifications of the analysis strategy using the embedded raw data.

In yet another further embodiment, the server is configured to transmit the file to the user computer by streaming an encrypted copy of the file to the user computer and the user computer is configured to decrypt the encrypted file.

In another further embodiment again, the unique identifier is a URL.

In another further additional embodiment, the server is configured to respond to the receipt of a file request containing the URL from the user computer by generating a launch file and transmitting the launch file to the user computer and the user computer is configured to use the launch file to initiate file transfer using the launch file.

In still yet another further embodiment, the launch file is encrypted and includes a second URL identifying the location of the requested file.

In yet another further embodiment again, the user computer is configured to enable access to raw data embedded in the file.

Yet another further additional embodiment includes receiving raw data, applying an analysis strategy to the raw data, generating a layout file containing the analysis strategy and in which the raw data is embedded, uploading the layout file to a server, providing a URL to a user, obtaining an encrypted URL from the server using the provided URL, decrypting the encrypted URL and obtaining the layout file using the decrypted URL.

Still another further embodiment again also includes opening the obtained layout file and modifying the analysis strategy contained within the obtained layout file.

DETAILED DESCRIPTION OF THE INVENTION

Turning now to the drawings, systems and methods of publishing scientific data are shown. In many embodiments, layout files including embedded raw data are published electronically to an intended audience and the intended audience is provided with information that enables access to the published layout files using a reader application. The reader application also enables the modification of the layout files including the modification of the analysis strategy contained within the layout file. In several embodiments the layout files contain raw data captured using flow cytometry. In other embodiments, the layout files use raw data captured using any of a variety of techniques.

Figure 1:
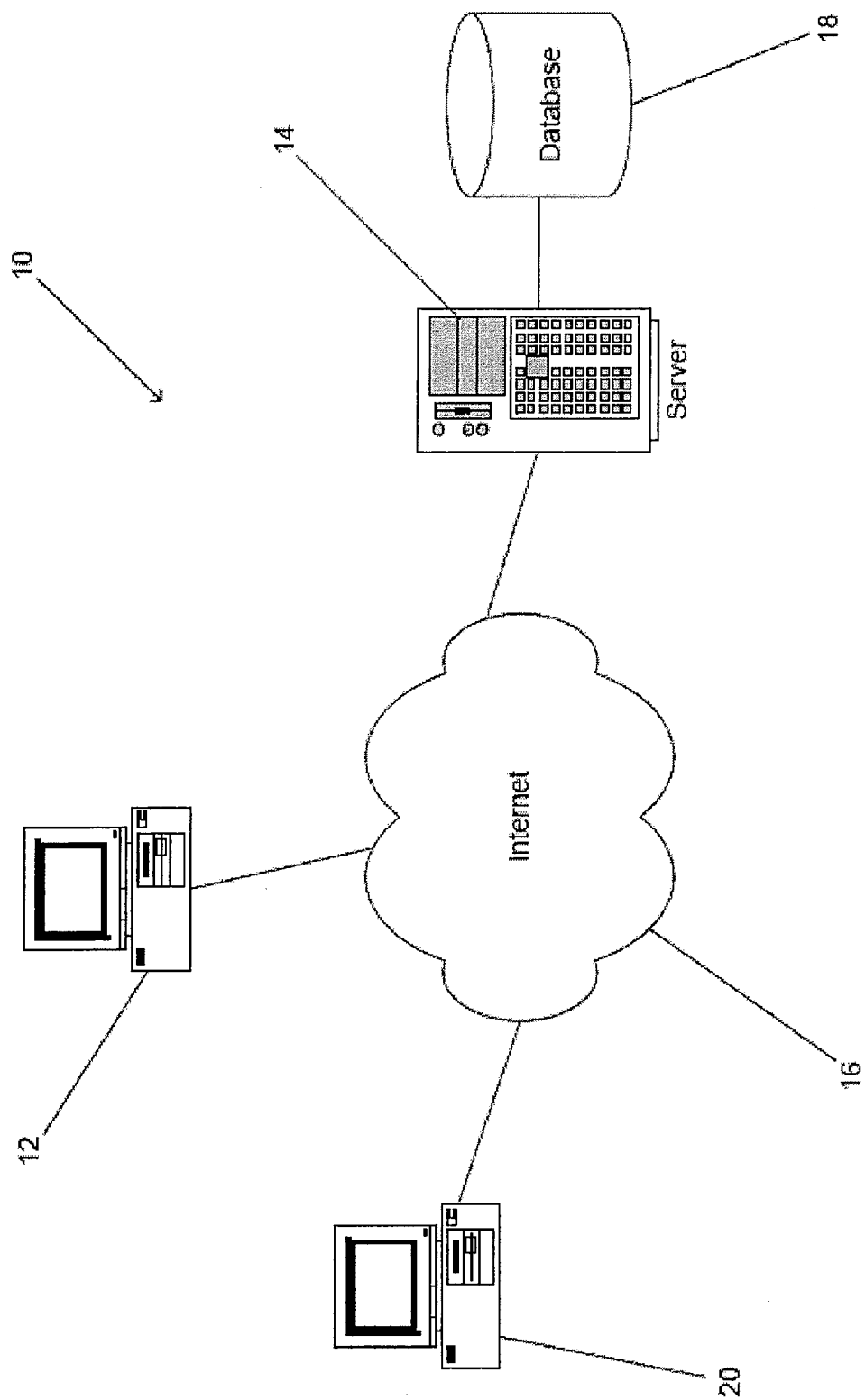
FIG. 1 is a schematic diagram of an electronic publication system in accordance with an embodiment of the invention.

An electronic publication system in accordance with an embodiment of the invention is shown in FIG. 1. The electronic publication system 10 includes a publisher computer 12 that is connected to a server 14 via a network 16. The server is connected to a database 18. A user computer 20 is also connected to the network.

The publisher computer 12 is configured to generate layout files based upon a set of raw data, which is often a batch of a number of data sets. In several embodiments, the raw data set is the output of an instrument including a scientific instrument such as a flow cytometer. In a number of embodiments, the raw data includes numerical values, images (such as images of cells or other subjects of an instrument), text values and/or categorical values. Categorical values occur when an instrument places a sample into one of a number of categories. For example, an instrument automatically assigning one or more cells to different categories based on cell type (e.g., T-cell, B-cell, natural killer or dendritic cell). In many embodiments, a layout file contains information enabling a simplified representation of underlying data in addition to the raw data. In a number of embodiments, the layout file includes a number of graphical objects, text information including information concerning the analysis strategy and the raw data. The graphical objects are typically graphical representations of the underlying data such as charts and often include plot overlays and gates. In a number of embodiments where the raw data is data captured using flow cytometry, the layout file includes the raw data in FCS format, an analysis strategy and a report containing charts, including chart overlays and gates, and text. In many embodiments, the report presents statistics in chart, table and/or text form. In several embodiments, the statistics presented in the report are drawn from a predetermined standard set of statistics. In other embodiments, the user is able to generate custom statistics that can then be included in a report. For applications other than flow cytometry, the layout file can include raw data acquired using any of a variety of techniques and a report including graphic and/or text and/or statistical elements.

Once the publisher computer 12 has generated a layout file, the layout file can be published using a publishing application in accordance with embodiments of the invention. In the illustrated embodiment, the publisher computer 12 is configured to electronically publish the analysis document by providing the analysis document to a general server 14. In many embodiments, a free publisher application and/or a publisher module that can be added to the software used to generate the layout files, or any other software, is distributed that enables anyone to electronically publish layout files to one or more general servers. In several embodiments, publishers can purchase a publisher application that enables publishers to electronically publish layout files to a server maintained by the publisher.

The server 14 is connected to a database 12. The server 14 stores layout files received from publisher computers 12 in the database and responds to requests from user computers 20 to access layout files. In many embodiments, the server 14 responds to a request for a layout file by streaming an encrypted copy of the layout file to the user computer 20 that requested the file. In other embodiments, the reader application is uniquely identifiable and the layout file is encrypted in a way that prevents other reader applications from downloading and saving the file.

The user computer 20 includes a reader application that enables the user to review layout files that have been electronically published in accordance with embodiments of the invention. As discussed above, the server 14 provides a requested layout file in a format that can be read by the reader application. The reader application enables the user to review the report contained within the layout file. When a layout file contains raw data, the reader application also enables the user to modify the analysis strategy presented within the layout file. Modification of the analysis strategy in a layout file using reader software in accordance with embodiments of the invention is discussed further below. In many embodiments, the reader application prevents access to the embedded data within the file. As is discussed further below, the permissions a reader application has to access, manipulate and/or perform other functions with respect a layout file can be set by the publisher computer.

In many embodiments, reader applications are distributed free and the reader applications include mechanisms that prevent the reader application from being used as a substitute for more expensive analysis software. In a number of embodiments, reader applications are prevented from loading data that is not contained within a published layout file, the reader application prevents the saving of the file, and/or the reader is prevented from printing and exporting the report in another file format. The, extent tow which a reader application can perform functions involving a layout file is typically determined by the publisher application. In embodiments where reader applications are freely distributed, the server 14 or another server can provide advertisements that are displayed via the user interface of the reader application. In a number of embodiments, the advertisements are tailored to the context of the published analysis, the user interface and/or the user of the reader application.

Although only a single publisher computer and a single user computer are shown in FIG. 1, many embodiments of the invention enable multiple publisher computers to publish layout files to a single database and multiple users can access the published layout files via the server using a reader application. In many embodiments, the server provides a user interface via a web browser that enables the searching of published layout files. In a number of embodiments, layout files are published with access permissions and only users with appropriate access credentials are able to access the published layout files. For example, a layout file can be published with access permissions enabling access by anyone possessing an appropriate URL and by anyone with "research" credentials that searches the database. In other embodiments, a variety of permissions are specified and a number of different types of credentials can be issued to users.

In the embodiment illustrated in FIG. 1, a single server is shown connected to the Internet and a database. In other embodiments, other architectures can be used to receive layout files from publisher computers and to make layout files available to user computers configured with reader applications. For example, multiple servers connected via a private network can be used including web servers, application servers and SQL servers that manage the database.

Although the above description refers to reader applications that obtain copies of layout files from servers using launch files, many other file transfer mechanisms can be used to transfer files between publisher computers and reader computers. In several embodiments, the publisher application places the layout file on a server, a networked drive or an FTP server and a user obtains a unique identifier from the publisher that can be used by the reader application to locate and download the layout file. In a number of embodiments, layout files are directly transferred between publisher computers and user computers and a digital rights management (DRM) scheme is used to secure the layout file. In many embodiments, the reader application is uniquely identified and the reader application's unique identity is utilized in the implementation of the DRM scheme. In other embodiments, other file transfer schemes can be used that restrict access to the information contained within the layout file.

Figure 2:
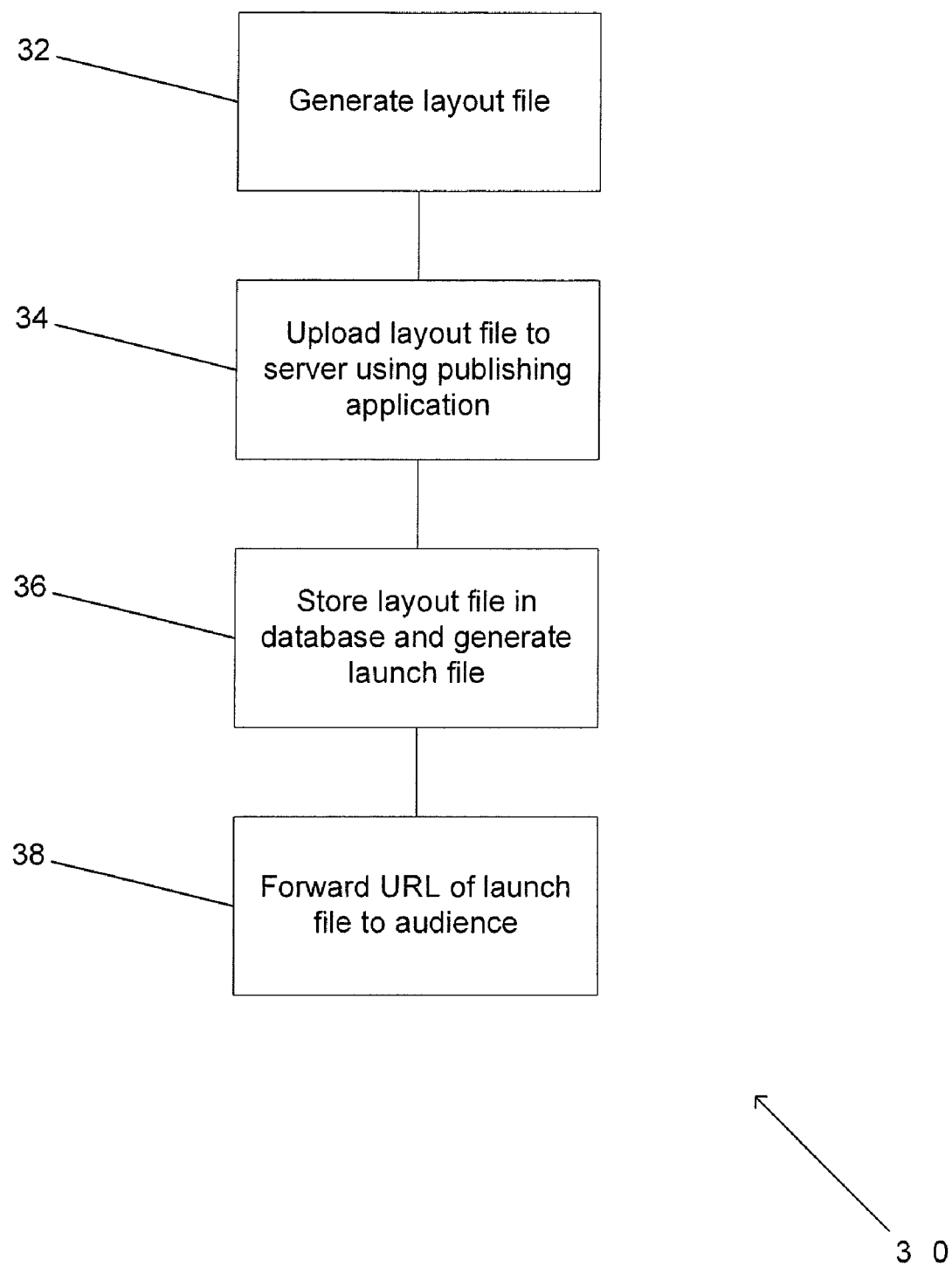
FIG. 2 is a flow chart showing a process for publishing a layout file in accordance with an embodiment of the invention.

As discussed above, a computer that is configured with a publisher application can be used to electronically publish a layout file. A flow chart illustrating a process for electronically publishing a review file in accordance with an embodiment of the invention is shown in FIG. 2. The process 30 includes generating (32) a layout file, which in many embodiments includes raw data, an analysis strategy and a report. In a number of embodiments, the layout file is tagged so that it can be read by reader application. In several embodiments, reader applications cannot read layout files generated by a publisher application unless the layout file includes information indicative of the fact that the layout file has been published. The layout file is then uploaded (34) to a server and the server stores (36) the layout file in a database. When storing the layout file in the database, the server generates a launch file containing information enabling a reader application to access the layout file. The launch file is typically encrypted to prevent access to the layout file unless a user possesses a certified reader application. Once the launch file has been generated, a URL that enables access to the layout file is provided to the publisher and/or forwarded (38) to an audience identified by the publisher. In the embodiment shown in FIG. 2, a URL is used to access a published layout file. In several embodiments, a user request using a URL results in the generation of a launch file that can be used to stream a layout file to the user. In other embodiments, other techniques can be used to provide users with information enabling access to a published layout file from the server using an appropriate reader application. For example, a layout file can be directly downloaded.

Figure 3:
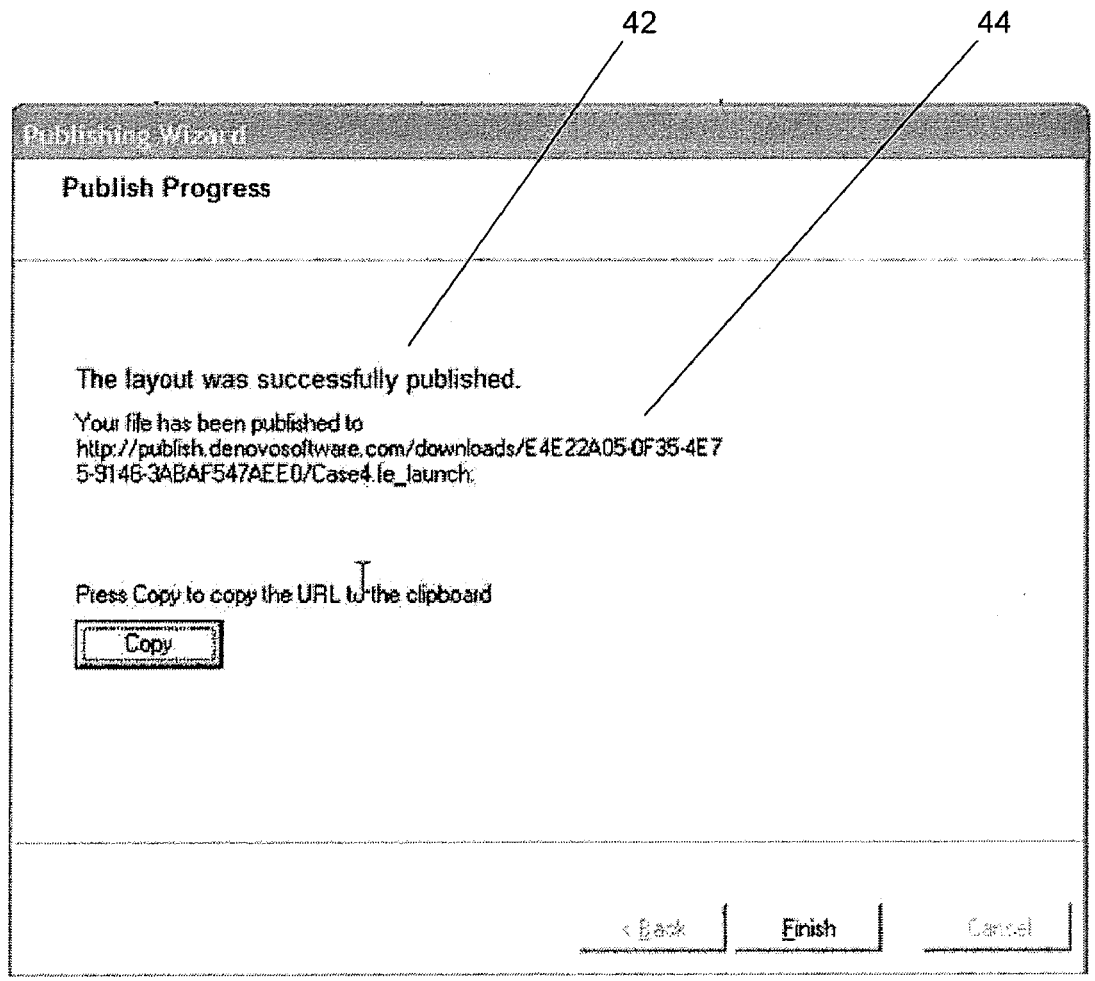
FIG. 3 is a screen shot of a publisher application showing a dialog box notifying a user that a layout file has been published and providing the URL of the publication in accordance with an embodiment of the invention.

A screen shot of a publisher application communicating a URL that can be used for obtaining a launch file is shown in FIG. 3. The screen shot 40 includes a notification 42 that the layout file was successfully published and a URL 44. As will be discussed further below, the URL can be used to obtain a launch file that enables an appropriate reader application to access the published layout file.

Figure 4:
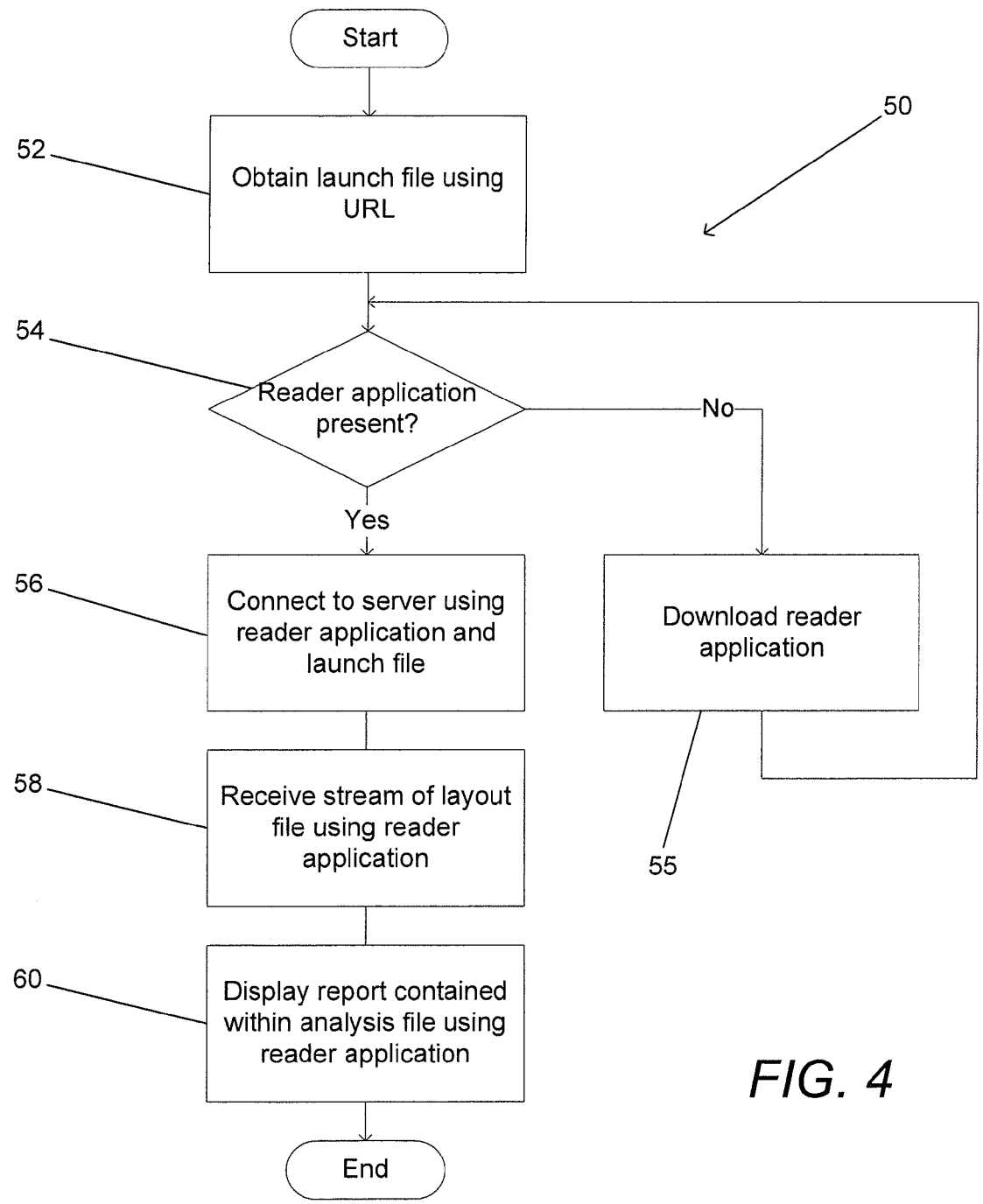
FIG. 4 is a flow chart showing a process for accessing a published layout file in accordance with an embodiment of the invention.

A process in accordance with an embodiment of the invention for displaying a published layout file on a user computer is shown in FIG. 4. The process 50 includes obtaining (52) a launch file using a URL. In many embodiments, the URL is provided to a user via email either by the publisher or by the publishing server and the launch file is encrypted. In one embodiment when a user provides the URL to a web browser, the browser detects (54) whether the user has the reader application associated with the launch file. If not, then the reader application can be downloaded (55). When a reader application is present, the reader application uses the launch file to connect (56) to a server and request a layout file specified by a URL within the launch file. Once the connection has been made, the server streams the layout file directly to the reader application. Streaming the layout file in this way can improve security, because the layout file is not able to be saved to the user's computer in a way that enables the user to access the layout file without the reader application. In many embodiments, the stream is encrypted and the reader application is capable of decrypting the encrypted stream. The reader application receives (58) the layout file and displays (60) the analysis strategy contained within the layout file. Once the reader application has received the layout file the reader application can enable modification of the analysis strategy contained within the layout file based upon the embedded raw data. The reader application can also enable the generation of static reports using the layout file.

Figure 5:
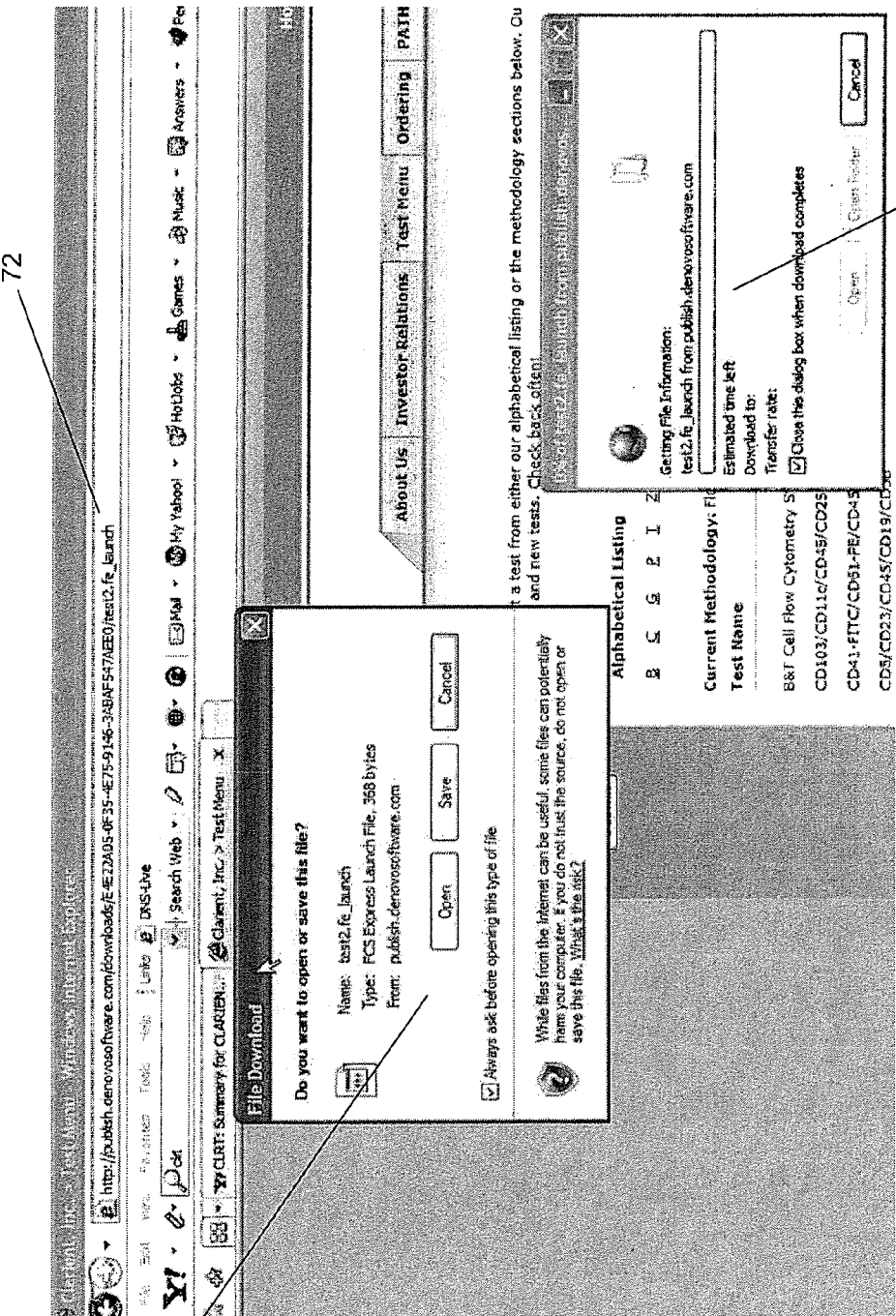
FIG. 5 is a screen shot showing a web browser application launching a reader application from a launch file in accordance with an embodiment of the invention.

A screen shot of a web browser application launching a reader application using a launch file is shown in FIG. 5. The screen shot 70 shows the web browser accessing a URL 72 that identifies a launch file. Directing the browser to the URL launch file launched a dialogue box 74 requesting whether to open or save the file. Selecting to open the launch file causes a second dialog box 76 to be launched, which communicates the progress of launching the reader and retrieving the published layout file identified by the launch file.

As discussed above, launch files are typically encrypted to prevent access to published layout files using applications other than an appropriate reader application. In many embodiments, the reader application possesses the encryption keys necessary to decrypt the launch file. The encryption scheme used can be any encryption scheme appropriate for communicating over a digital data network and for the robustness requirements of a particular application. An example of an unencrypted launch file encoded in an XML format is reproduced below:

```
<?xml version="1.0" encoding="windows-1252"?>
  <fse_express_launchversion="1">
    <fcs_express_layout>
      <data_source type="publish_stream">
        <publish_stream gatewayURL="http://publish.denovosoftware.com/BIN">
          <publish_file_info
          customerID="{E4E22A05-0F35-4E75-9146-3ABAF547AEE0}"
          remoteFilename="Case4"/>
        </publish_stream>
      </data_source>
    </fcs_express_layout>
  </fse_express_launch>
```

The launch file is an XML file that includes information identifying a layout file that a reader application can stream from an identified server. In the example provided above, the layout file is named "Case4" and was published by a publisher identified as "{E4E22A05-0F35-4E75-9146-3ABAF547AEE0}". The launch file also associates the layout file with the appropriate reader application and identifies that the layout file can be streamed from a server identified using the URL "http://publish.denovosoftware.com/BIN".

Figure 6:
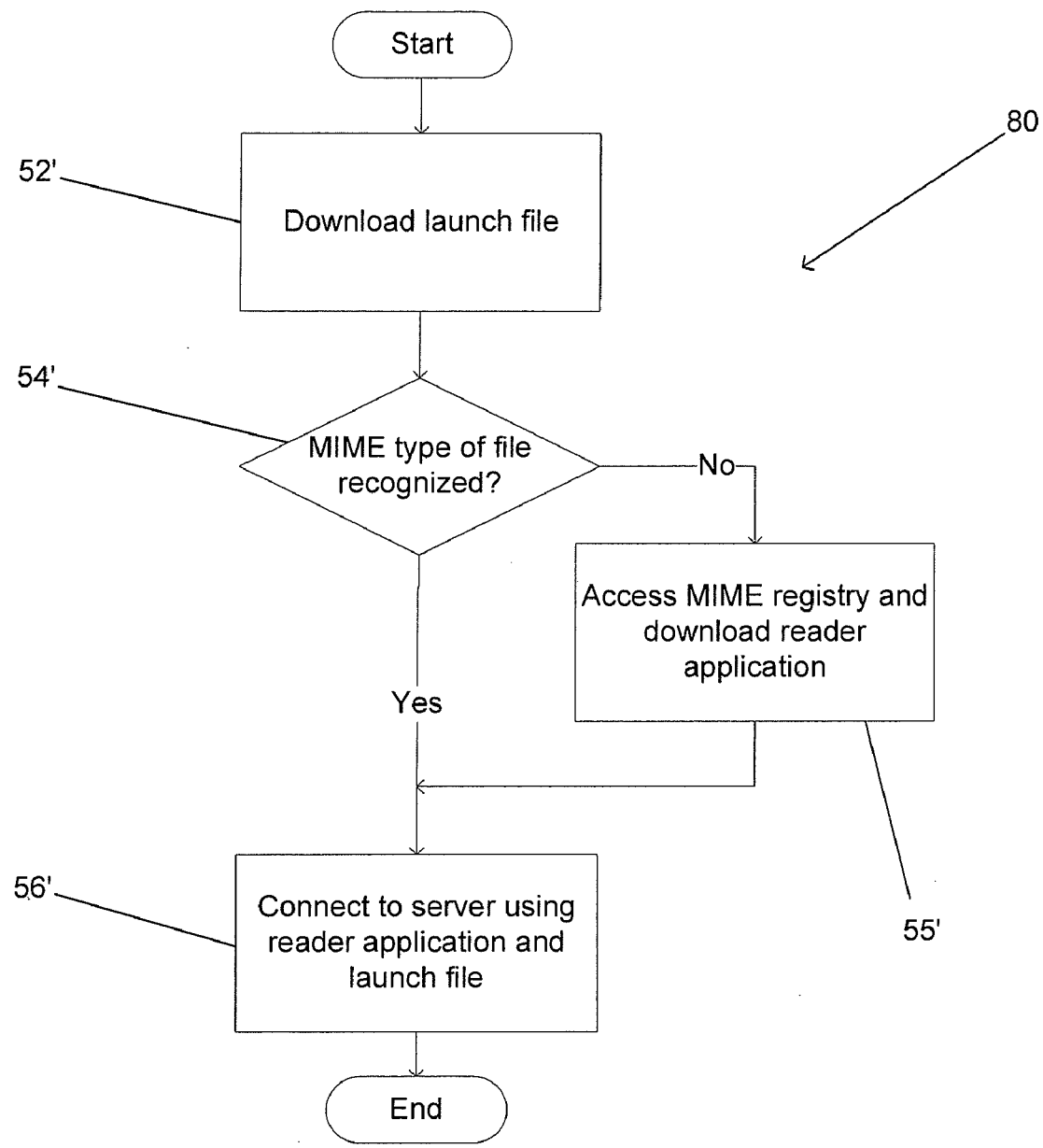
FIG. 6 is a flow chart showing a process for accessing a published layout file using a launch file in accordance with an embodiment of the invention.

A process for obtaining a layout file using a launch file similar to the launch file described above is shown in FIG. 6. The process 80 includes downloading (52') the launch file using a URL that identifies the location of the launch file. As discussed above, the launch file provides information identifying a layout file, a server that can stream the layout file and an application that can be launched to connect with the server. In order to use the launch file, a determination (54') is made as to whether the MIME type of the launch file is recognized. If the MIME type is not recognized, then a MIME registry is used to navigate to an appropriate website where a reader application associated with the MIME type can be downloaded (55'). If the MIME type of the launch file is recognized, then the reader application is present and the reader application can use the launch file to connect (56') to the server.

In many embodiments, the reader application is freely available for download. In a number of embodiments, the reader application is available for purchase. In several embodiments, a basic reader application is available for free and a reader application including a wider range of functionality is available for purchase. In a number of embodiments, the free reader application places limits on the files that can be opened, the aspects of the layout file that can be accessed and/or the ability to save files. In many embodiments, only published layout files can be read using the free reader application and the free reader application can modify an analysis strategy using data embedded in a published layout file, but cannot access the embedded data. When a reader application is used that cannot save layout files, modifications to the layout file can be preserved by using the reader application to republish the revised layout file, publish the revised layout file as a separate version of the original layout file or to publish the revised layout file separately.

Figure 7:
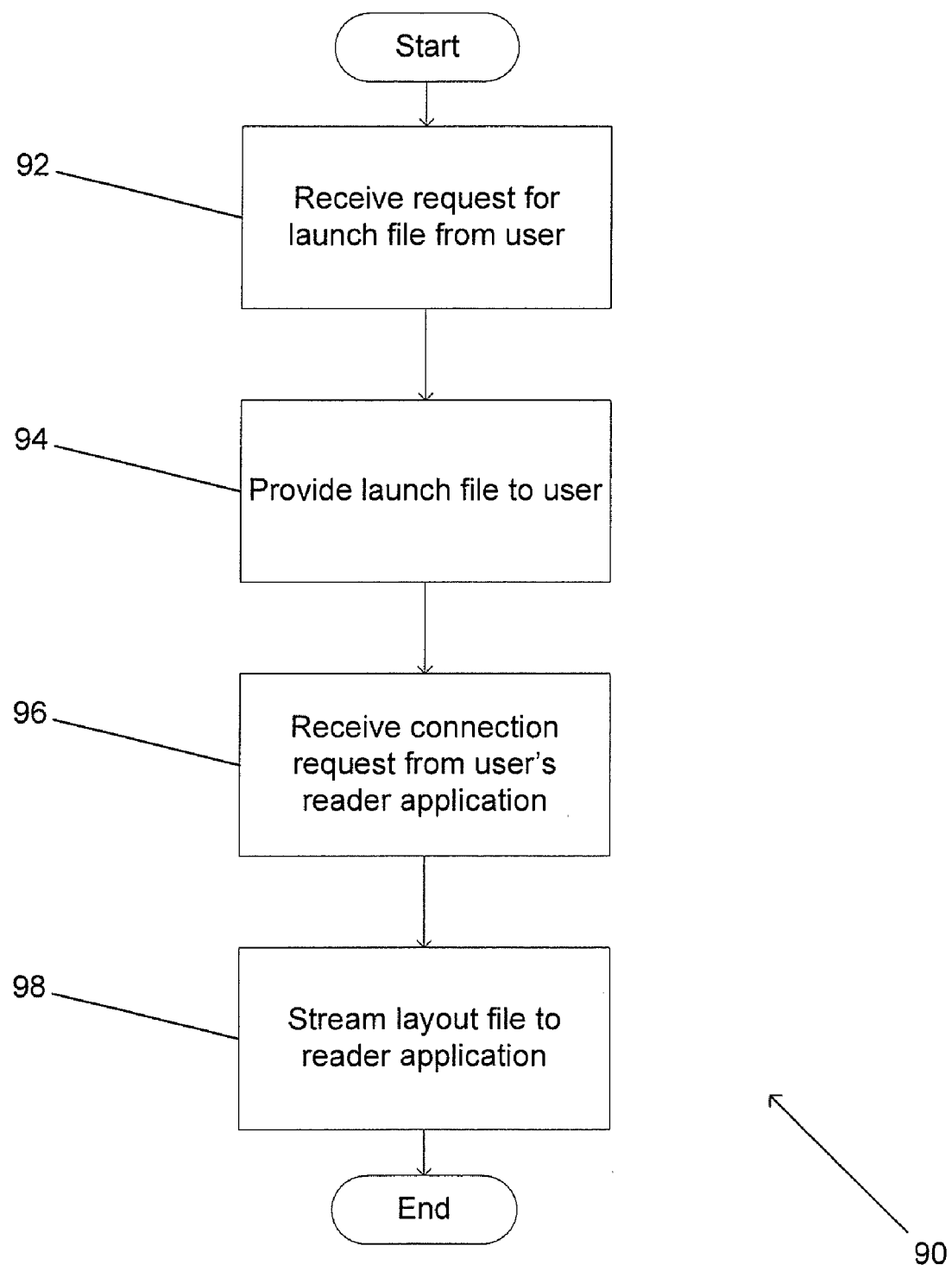
FIG. 7 is a flow chart showing a process for providing a published layout file to a reader application in accordance with an embodiment of the invention.

A process for streaming a layout file to a user in accordance with an embodiment of the invention is shown in FIG. 7. The process 90 includes receiving (92) a request for a launch file from a user and providing (94) the launch file to the user. A request to establish a connection is received (96) from the user and a layout file is streamed (98) to the user once the request is established. In a number of embodiments, an encrypted layout file is streamed to the user and the user requires a certified reader application in order to decrypt the layout file. As is discussed above, streaming layout files is simply one technique for distributing published layout files in accordance with embodiments of the invention. In other embodiments, one or more of a variety of techniques can be used to provide published layout files to user. When a published layout file is streamed, the user is typically unable to store the published layout file in a manner that enables access to the underlying data. The reader application can be used to modify the analysis, but usually cannot be used to directly view or export the raw data values. In several embodiments, the layout file can be locally saved on a user computer. In many embodiments, however, a layout file cannot be locally saved.

Figure 8:
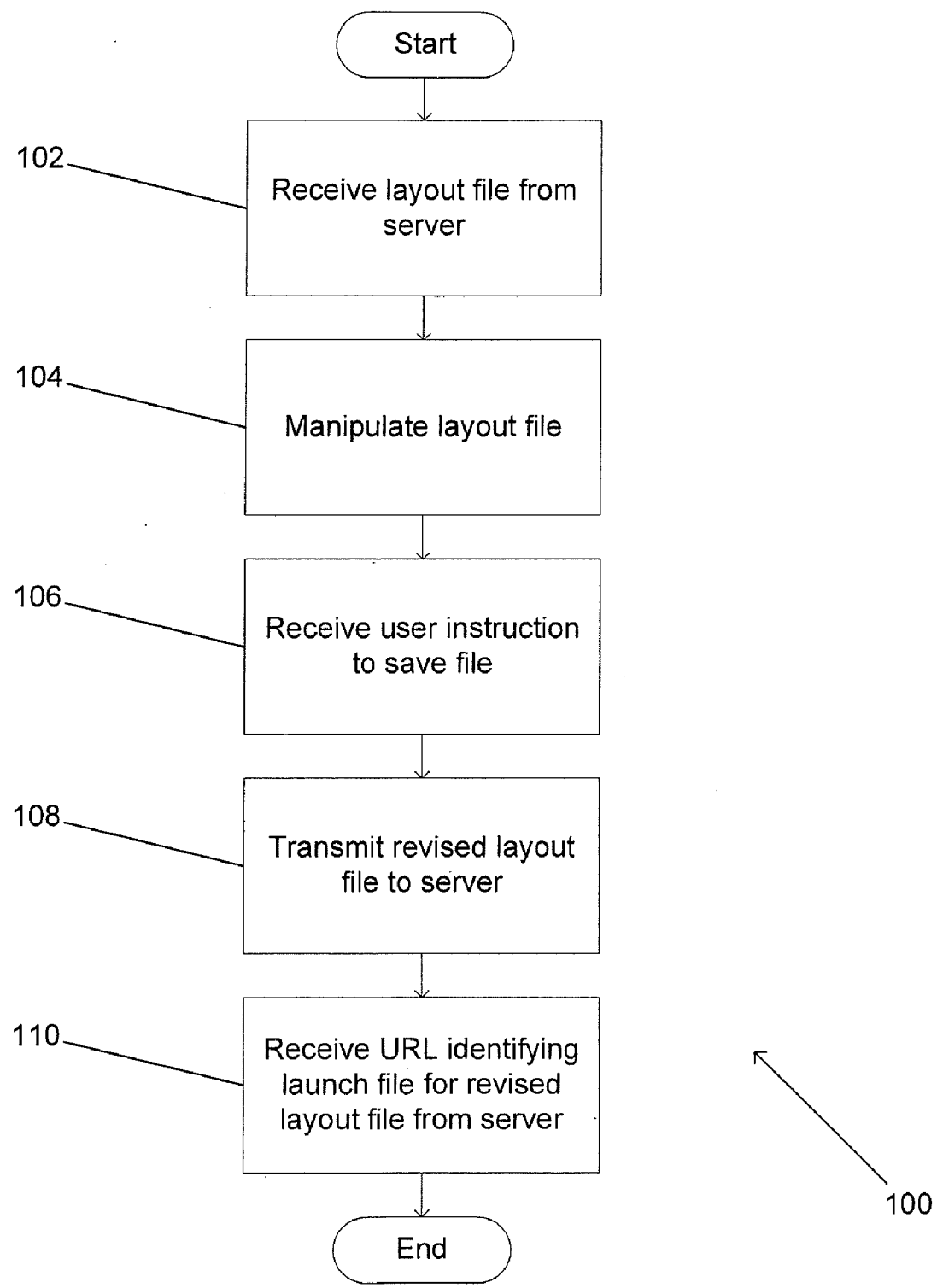
FIG. 8 is a flow chart showing a process for reviewing, modifying and saving a published layout file in accordance with an embodiment of the invention.

A process for modifying a layout file using a reader application and publishing the revised layout file in accordance with the invention is shown in FIG. 8. The process 100 includes receiving (102) a layout file from a server and manipulating (104) the layout file. The manipulations can be as simple as adding text or modifying the layout of graphical objects. However, the modifications could be as involved as modifying the analysis strategy and generating a new report by applying the new analysis strategy to the raw data embedded in the file. Once the modifications are complete, an instruction to save the modifications can be received (106) from the user. In response to the instruction, the revised layout file is transmitted (108) to the server. The server then either replaces the original layout file or creates a new version of the layout file and provides the reader application with the information required to access the revised layout file. In the illustrated embodiment, the received (110) information identifying the revised layout file is a URL identifying a launch file.

Figure 9:
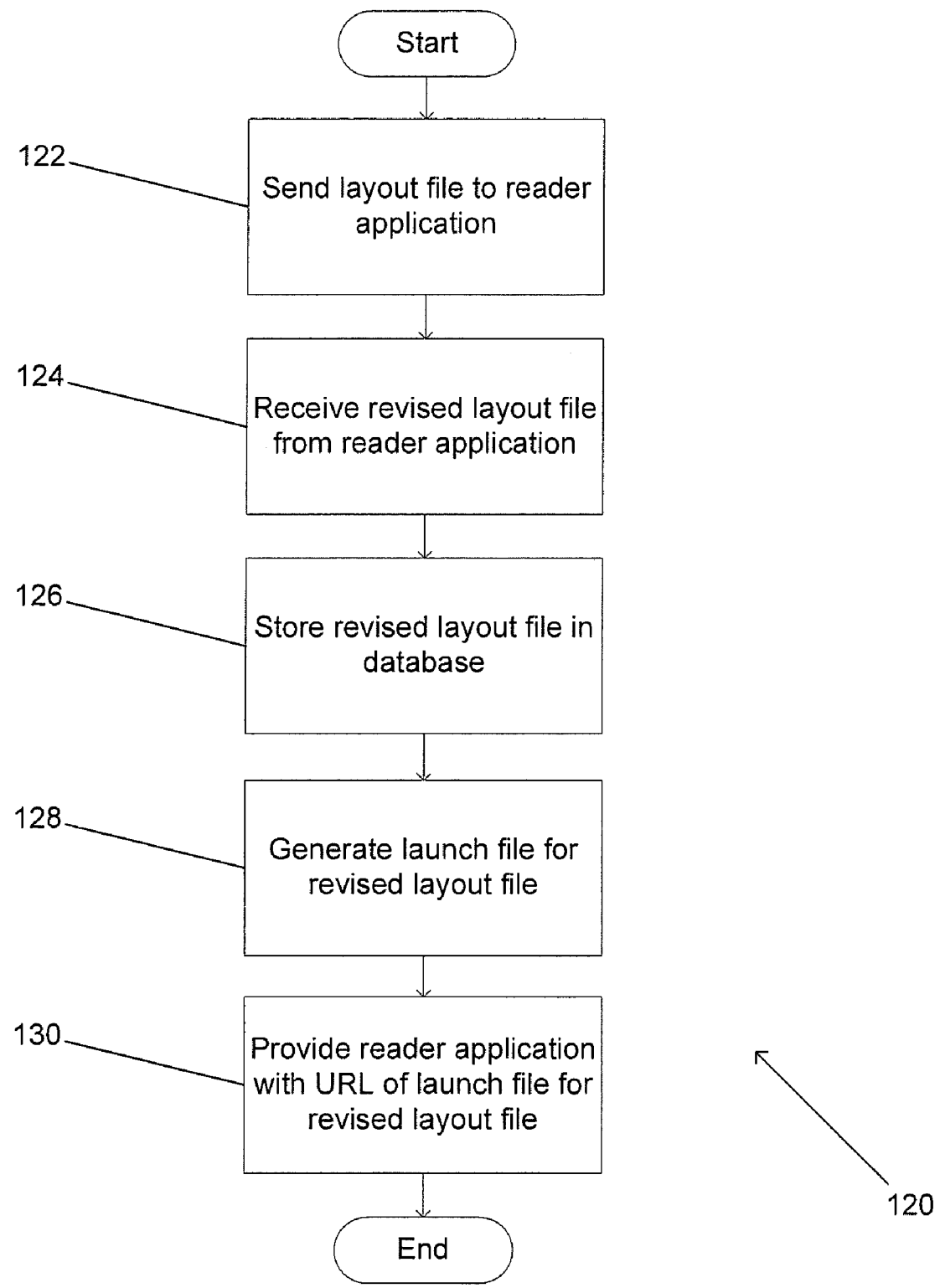
FIG. 9 is a flow chart showing a process for providing access to a published layout file and publishing a revised version of the layout file in accordance with an embodiment of the invention.

A process that can be used by a server for storing a revised layout file in accordance with an embodiment of the invention is shown in FIG. 9. The process 120 includes retrieving an original layout file from a database and streaming (122) the original layout file to the reader application. At some point, the reader application provides (124) a revised layout file. The revised layout file is stored (126) in a database and a launch file is generated (128) that contains information enabling a reader application to access the revised layout file. A URL identifying the launch file is then provided (130) to the reader application.

Figure 10:
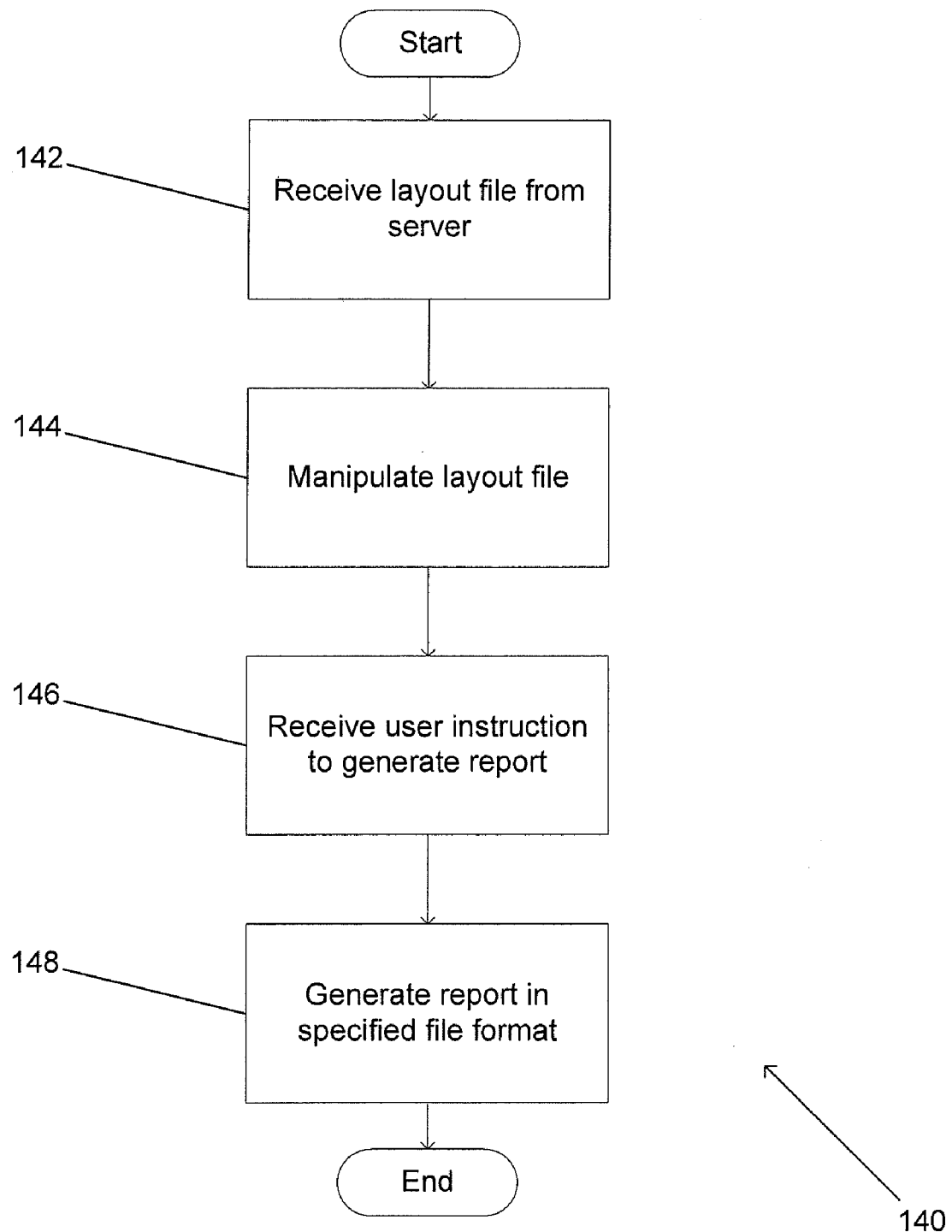
FIG. 10 is a flow chart showing a process for generating a report in accordance with an embodiment of the invention.

Many software applications that enable manipulation of layout files also enable printing of reports and/or generation of report files that can be accessed using common applications. Reader applications in accordance with embodiments of the invention also enable the printing of reports (that do not include raw data) in common file formats. A process for generating a report in a specified file format in accordance with an embodiment of the invention is shown in FIG. 10. The process 140 includes receiving (142) a layout file from a server, manipulating (144) the layout file and receiving (146) an instruction from a user to generate a report. A report is then generated (148) in a specified file format in a manner that is similar to the manner in which prior art software applications generate reports using layout files.

Figure 11:
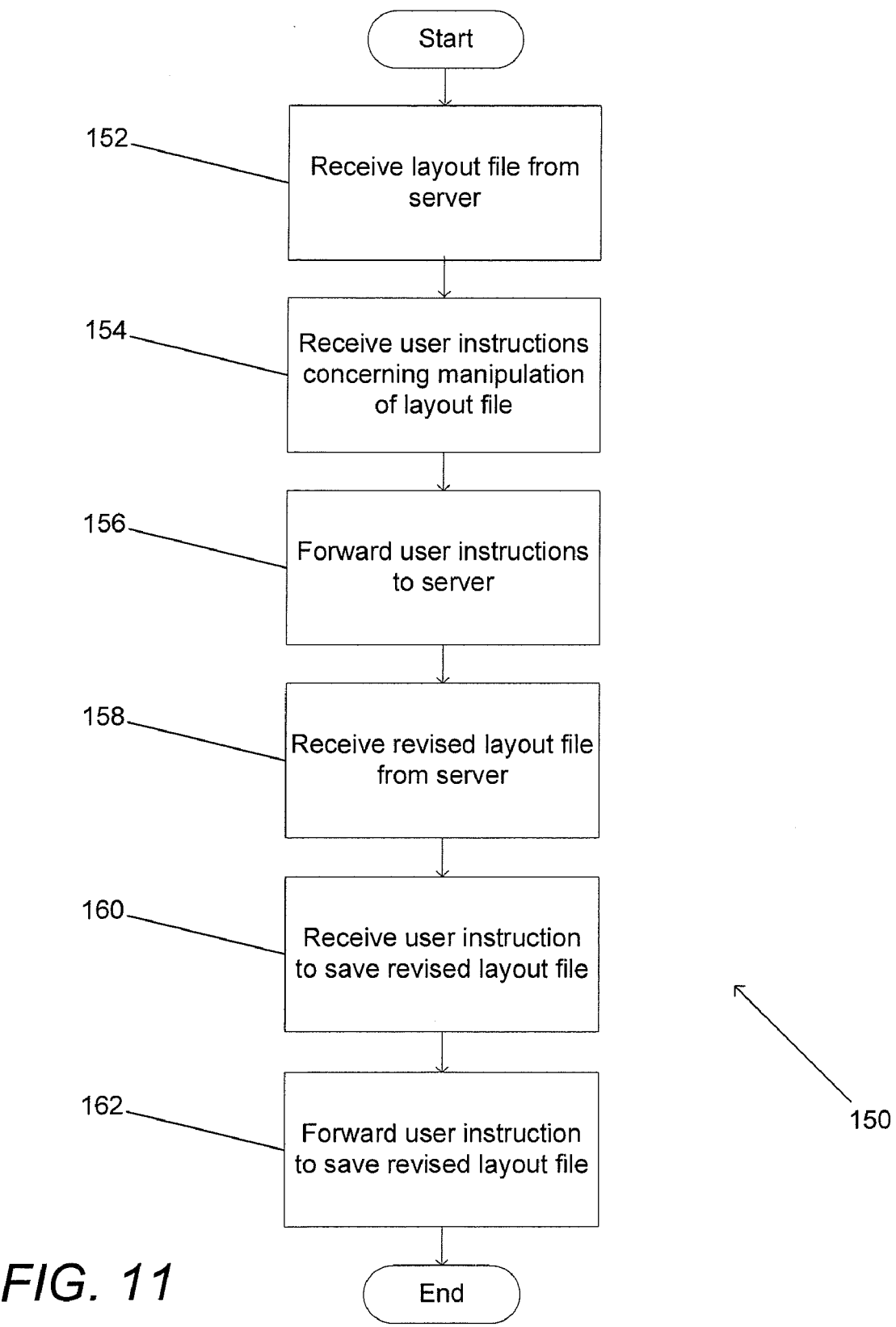
FIG. 11 is a flow chart showing a process for reviewing, modifying and saving a published layout file in accordance with another embodiment of the invention.

In the discussion above, the entire layout file is streamed to the reader application and the reader application performs all of the processing associated with applying a revised analysis strategy to a layout file. In a number of embodiments, the server provides the user with a layout file or a portion of a layout file such as a report that the user can manipulate. However, the server performs revisions to the analysis strategy in the layout file and streams the results of the revised analysis strategy back to the reader application. A process for accessing a layout file, modifying the file and publishing the revised file is shown in FIG. 11. The process 150 includes (152) receiving a layout file from a server, receiving (154) user instructions concerning the manipulation of the layout file, and forwarding (156) to the server user instructions concerning changes to the analysis strategy. A revised layout file is received (158) from the server and after a time a user instruction can be received (160) that directs the revised layout file be saved. The user instruction is forwarded to the server, which can then save the revised layout file by replacing the original layout file, by saving the revised layout file as a new version of the original layout file or by saving the revised layout file entirely separately of the original layout file.

Figure 12:
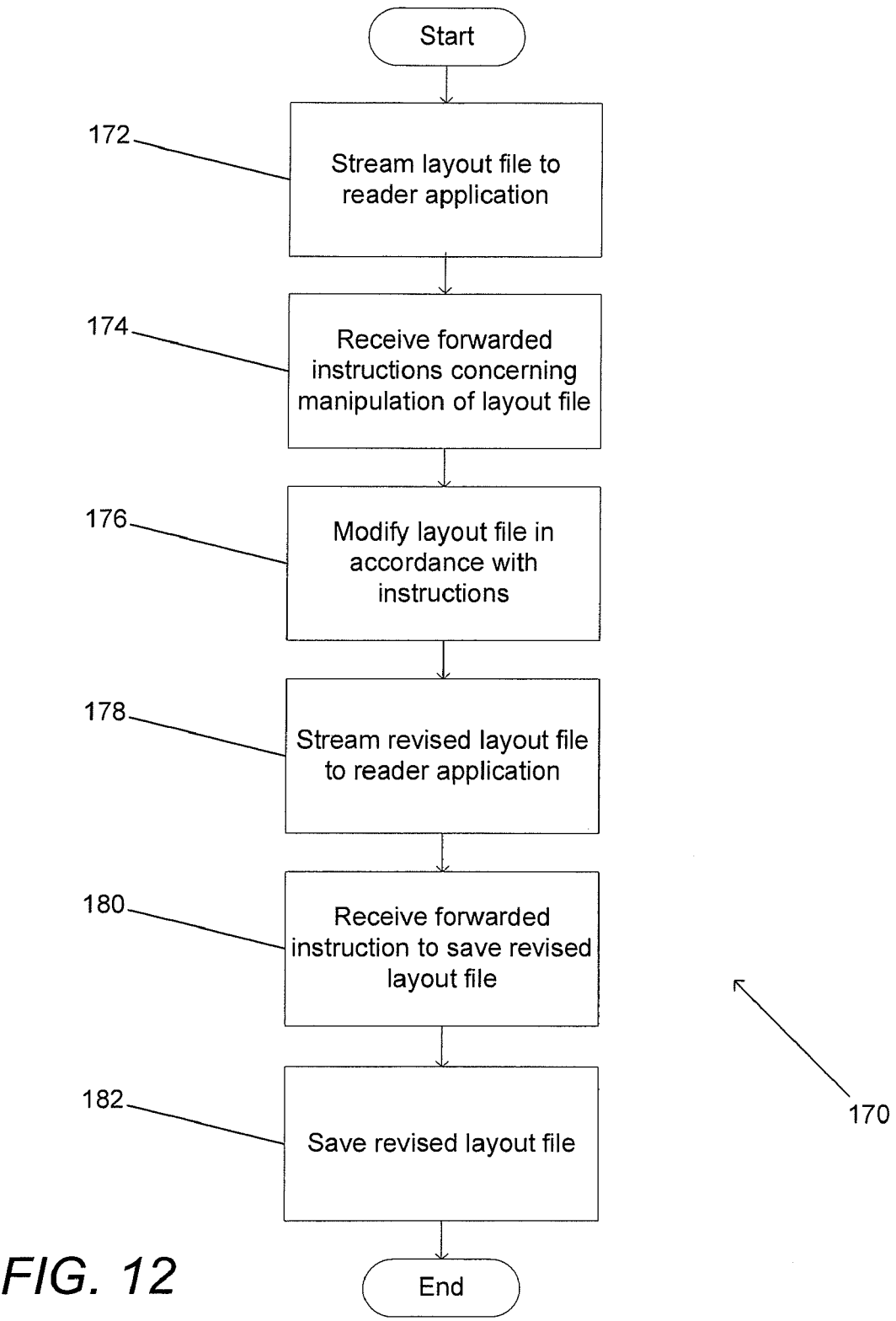
FIG. 12 is a flow chart showing a process for providing access to a published layout file, modifying the layout file and saving the modified layout file in accordance with an embodiment of the invention.

A process that can be used by a server to provide access to layout files, modify the analysis within the layout file and save the layout file is shown in FIG. 12. The process 170 includes streaming (172) a layout file to a reader application and then receiving (174) forwarded instructions concerning manipulation of the layout file. The layout file is modified (176) in accordance with the instructions and a revised layout file is streamed (178) to the reader application. At some point, an instruction can be received (180) to save the revised layout file. In response to the receipt of such an instruction, the revised layout file is saved. In a number of embodiments, the revised layout file is saved as a new document, the revised layout file replaces the original layout file or the layout file is saved as a new version of the original layout file. In embodiments where the revised layout file is saved in a way that requires the use of a new launch file to access the revised layout file, then a new launch file is generated and a URL identifying the launch file can be provided to the reader application, which requested that the revised layout file be saved.

Figure 13:
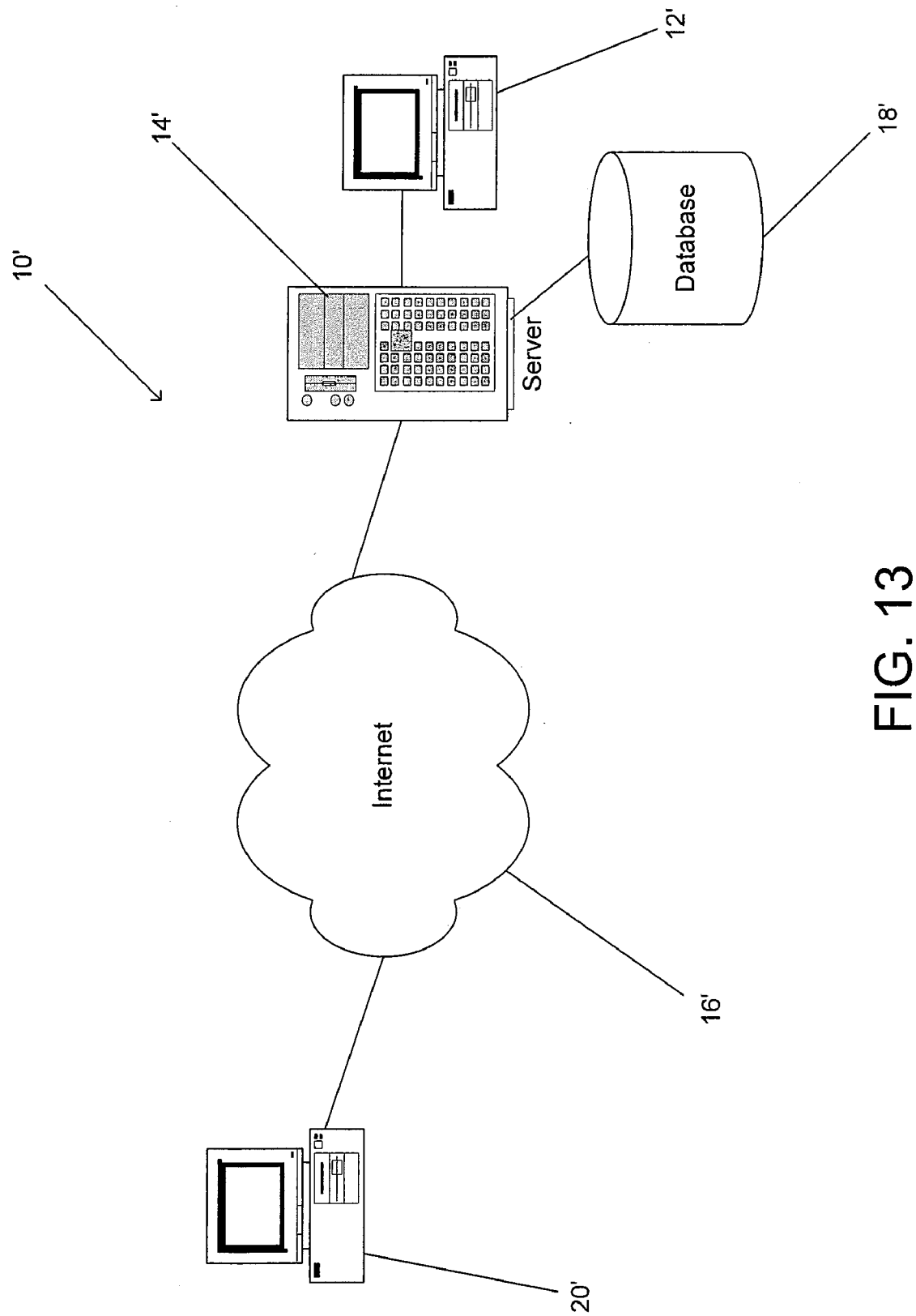
FIG. 13 is a schematic diagram of an electronic publication system in accordance with a further embodiment of the invention.

In the embodiment shown in FIG. 1, a number of publishers publish to a single server. As discussed above, a publisher can maintain its own server. An embodiment of a publisher that publishes to its own server is shown in FIG. 13. The electronic publishing system 10' includes a publisher computer 12' that is connected to a server 14'. In the illustrated embodiment, the publisher computer 12' publishes layout files directly to the server 14', which stores them in the database 18'. In other embodiments, the publisher computer 12' communicated with the server via a private network and/or a public network such as the Internet. A feature of the architecture shown in FIG. 13 and similar architectures is that the publisher controls who can publish layout files to the server 14'. As with the embodiment shown in FIG. 1, a number of user computers 20' can communicate with the publisher's server 14' via the Internet 16'. In addition, the publisher can publish to a local hard drive, and then copy the published layout file to the internet, or give the published layout file to someone to put on the Internet. A published layout file can also be accessed by placing a URL that locates the published layout file on the Internet.

In embodiments where a publisher purchases a publisher application, the publisher application can be provided with advanced features. In many embodiments, the advanced features include the ability to define permissions for almost all operations with respect to a published layout file. Examples of permissions that can be specified include the ability of the reader application to access the embedded raw data, the ability of the reader application to locally save the layout file and the ability of the reader application to print the layout file.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A system for electronically publishing analysis of raw data generated by an instrument, comprising:
   a publication computer connected to a network and configured using a publisher application;
   a user computer connected to the network and configured using a reader application;
   wherein the publication computer is configured to:
      format the raw data;
      generate a report by analyzing the formatted raw data using an analysis strategy; and
      generate a file including the report generated by analyzing the formatted raw data using the analysis strategy where the formatted raw data and the analysis strategy are embedded in the file;
   wherein the publication computer is configured by the publisher application to publish the file for access by the user computer using the reader application;
   wherein the user computer is configured by the reader application to receive the published file;
   wherein the user computer is configured by the reader application to:
      display the report contained within a published file;
      perform modifications of the analysis strategy; and
      create an updated report by applying the modified analysis strategy to the formatted raw data embedded within the published file; and
   wherein the user computer is configured using the reader application so that the user computer cannot load raw data unless the raw data is formatted and embedded within a file published using the publisher application.

2. The system of claim 1, wherein the raw data comprises at least one data set of instrument measurements expressed as numerical values.

3. The system of claim 1, wherein the raw data comprises at least one image.

4. The system of claim 1, wherein the raw data comprises categorical values.

5. The system of claim 1, wherein the analysis strategy includes text information.

6. The system of claim 1, wherein the analysis strategy includes graphical objects.

7. The system of claim 6, wherein the graphical objects include plots.

8. The system of claim 6, wherein the graphical objects include plot overlays.

9. The system of claim 1, wherein the analysis strategy includes gates.

10. The system of claim 1, wherein the analysis strategy includes statistics.

11. The system of claim 1, further comprising:
   a server connected to the network;
   a database connected to the server;
   wherein the publication computer is configured by the publisher application to publish the file for access by the user computer by transmitting the file to the server;
   wherein the server is configured to store files received from one or more publication computers in the database;
   wherein the user computer is configured by the reader application to receive the published file by requesting the published file from the server;
   wherein the server is configured to respond to the file request from the user computer by retrieving the requested published file from the database and transmitting the published file to the user computer.

12. The system of claim 11, wherein:
   the server is configured to transmit the published file to the user computer by streaming an encrypted copy of the published file to the user computer; and
   the user computer is configured to decrypt the encrypted published file.

13. The system of claim 12, wherein:
   the user computer is configured to receive a URL; and
   the user computer is configured to request the published file from the server using the URL.

14. The system of claim 13, wherein:

the server is configured to respond to receipt of a published file request containing a URL from a user computer by generating a launch file and transmitting the launch file to the user computer; and the user computer is configured by the reader application to use the launch file to initiate the transmission of the published file by the server.

15. The system of claim 14, wherein the launch file is encrypted and includes a second URL identifying the location of the requested published file.

16. The system of claim 11, wherein the reader application configures the user computer to save modifications to the file.

17. The system of claim 11, wherein the reader application configures the user computer to print the file.

18. The system of claim 11, wherein the reader application prevents the user computer from reading files unless they are received from the server.

19. The system of claim 11, wherein:
the user computer is configured by the reader application to send a search request to the server; and
the server is configured to provide a list of files stored on the database that satisfy the search request.

20. The system of claim 1, wherein the raw data is generated by a scientific instrument and contains at least one of numerical values, strings or images.

21. The system of claim 20, wherein the instrument is a flow cytometer.

22. The system of claim 20, wherein the instrument captures images and the raw data includes at least one image file.

23. The system of claim 1, wherein the publication computer is configured by the publisher application to transfer the published file to the user computer by providing the file to a server and providing the user computer with a unique identifier.

24. The system of claim 23, further comprising:
an FTP server connected to a network;
wherein the publication computer is configured to provide the published file to the FTP server;
wherein the FTP server is configured to store the published file;
wherein the user computer is configured to receive the published file by requesting the published file from the FTP server using the unique identifier; and
wherein the FTP server is configured to respond to the request from the user computer by transmitting a published file identified by the unique identifier to the user computer.

25. The system of claim 1, wherein:
the user computer is uniquely identifiable; and
access to the file is restricted to the uniquely identifiable user computer.

26. The system of claim 1, wherein the file transfer is via electronic mail.

27. A system for electronically publishing analysis of raw data generated by an instrument, comprising:
a publication computer connected to a network and configured using a publisher application; and
a user computer connected to the network and configured using a reader application;
wherein the publication computer is configured to:
format the raw data;
generate a report by analyzing the formatted raw data using an analysis strategy; and
generate a file including the report generated by analyzing the formatted raw data using the analysis strategy, where the formatted raw data and the analysis strategy are embedded in the file, and the file is published by uploading the published file to a server;
wherein the server is configured to provide the publication computer with a unique identifier enabling access to the published file;
wherein the user computer is configured by a web browsing application to use the unique identifier to request the published file from the server;
wherein the server is configured to stream an encrypted version of the published file to the user computer; and
wherein the user computer is configured using the reader application to:
receive the encrypted file from the server;
decrypt at least portions of the published file;
perform modifications of the analysis strategy; and
create an updated report by applying the modified analysis strategy to the formatted raw data embedded within the published file; and
wherein the user computer is configured using the reader application so that the user computer cannot load raw data unless the raw data is formatted and embedded within a file published using the publisher application.

28. The system of claim 27, wherein the unique identifier is a URL.

29. The system of claim 28, wherein:
the server is configured to respond to receipt of a file request containing the URL from the user computer by generating a launch file and transmitting the launch file to the user computer; and
the user computer is configured by the reader application to use the launch file to initiate file transfer using the launch file.

30. The system of claim 29, wherein the launch file is encrypted and includes a second URL identifying the location of the requested published file.

31. A method of electronically publishing analysis of raw data, comprising:
receiving raw data;
formatting the raw data;
applying an analysis strategy to the formatted raw data;
generating a layout file containing the analysis strategy and in which the formatted raw data is embedded;
publishing the layout file using a publisher application, where the published layout file is capable of being opened by a reader application;
uploading the published layout file to a server using a publisher application;
providing a URL;
obtaining an encrypted URL from the server using the provided URL using a reader application;
decrypting the encrypted URL using the reader application;
obtaining the layout file using the decrypted URL using the reader application;
opening the published layout file using the reader application, where the reader application cannot load raw data unless it is formatted and within a layout file published using the publisher application; and
modifying the analysis strategy contained within the obtained layout file using the reader application.

* * * * *